Aug. 30, 1932.     E. H. FAHRNEY     1,874,091
PROCESS OF AND APPARATUS FOR CARBONATING LIQUIDS
Filed June 5, 1931      2 Sheets-Sheet 1
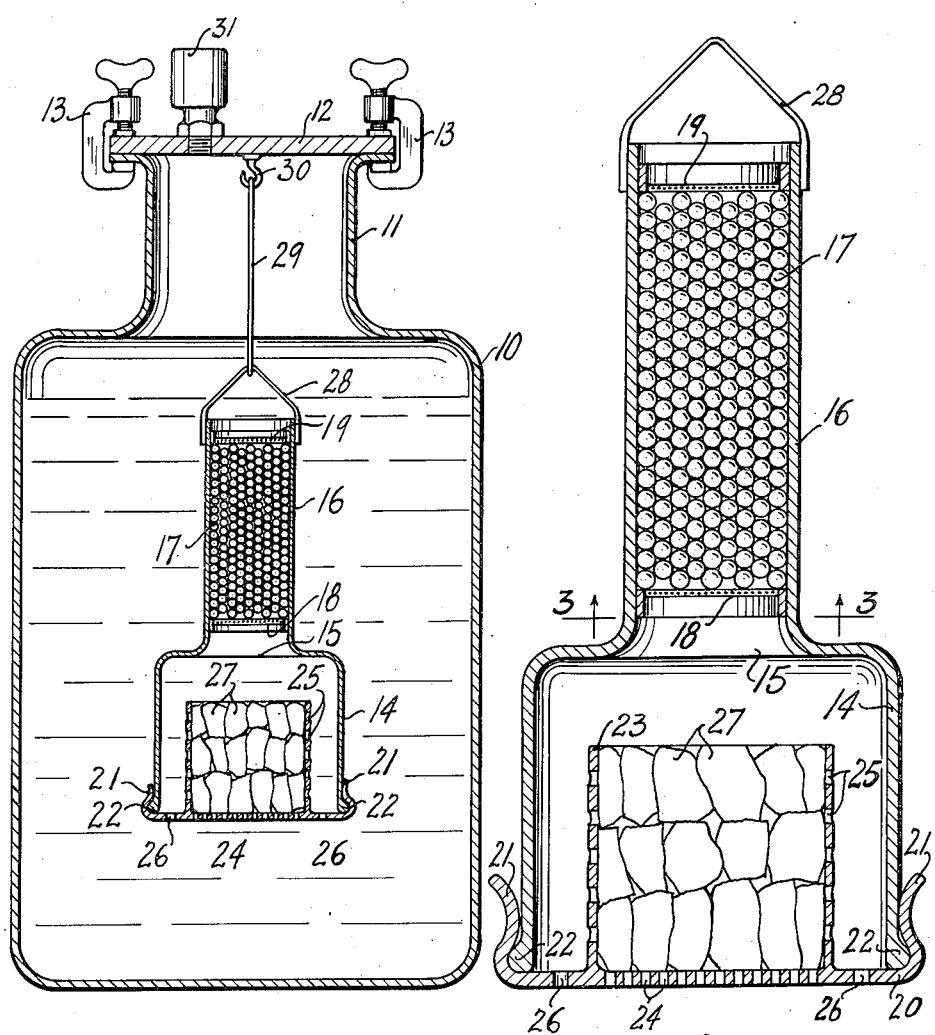
FIG 1      FIG 2
FIG 3
INVENTOR.
EMERY H FAHRNEY
BY 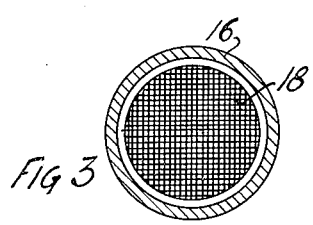
ATTORNEY Patented Aug. 30, 1932

1,874,091

UNITED STATES PATENT OFFICE

EMERY H. FAHRNEY, OF CHICAGO, ILLINOIS

PROCESS OF AND APPARATUS FOR CARBONATING LIQUIDS

Application filed June 5, 1931. Serial No. 542,242.

The present method of carbonating liquids is by charging the liquids with compressed carbon dioxide gas ($CO_2$) which is dispensed or sold to the public in heavy steel containers or bottles, which is more or less expensive.

It is well known that a liquid to be carbonated with carbon dioxide will absorb more $CO_2$ when the liquid is cold, and that the liquid will absorb more $CO_2$ when it is under pressure.

It is one of the objects of the present invention to provide an improved process of carbonating liquid and an improved apparatus for carrying the process into operation. To that end it is proposed to employ compressed carbon dioxide ($CO_2$) snow, (known in the trade as dry ice) in the form of cakes, blocks or masses of substantial size and place them into a receptacle, cage or basket, and then immerse the same into the liquid to be carbonated.

The material upon being thus immersed, or by being acted upon by the liquid as the liquid flows into contact therewith, or through the basket or container, will act to not only carbonate the liquid but will also refrigerate the same as well as create the necessary pressure and thereby accelerate the process of carbonating.

The compressed mass of carbon dioxide gas inserted into the liquid has the first effect of reducing the temperature of the liquid to cause the same to absorb more of the carbon dioxide gas than it would do if the liquid is warm.

A further object is to provide improved means for insuring a thorough disintegration of the gas and impregnation of the liquid therewith.

To the attainment of these ends and the accomplishment of other new and useful objects as will appear, the invention consists in substantially the process or method hereinafter described and in substantially the construction, combination and arrangement of the parts of the apparatus hereinafter shown and as more fully described and claimed.

With reference to the accompanying drawings there is shown more or less diagrammatically suitable apparatus for carrying this method into operation, and in the drawings Figure 1 is a view in vertical section of one form of apparatus constructed in accordance with the principles of this invention.

Figure 2 is an enlarged vertical sectional view of the container for the carbon dioxide snow.

Figure 3 is a detail sectional view taken on line 3—3, Figure 2.

Figure 4:
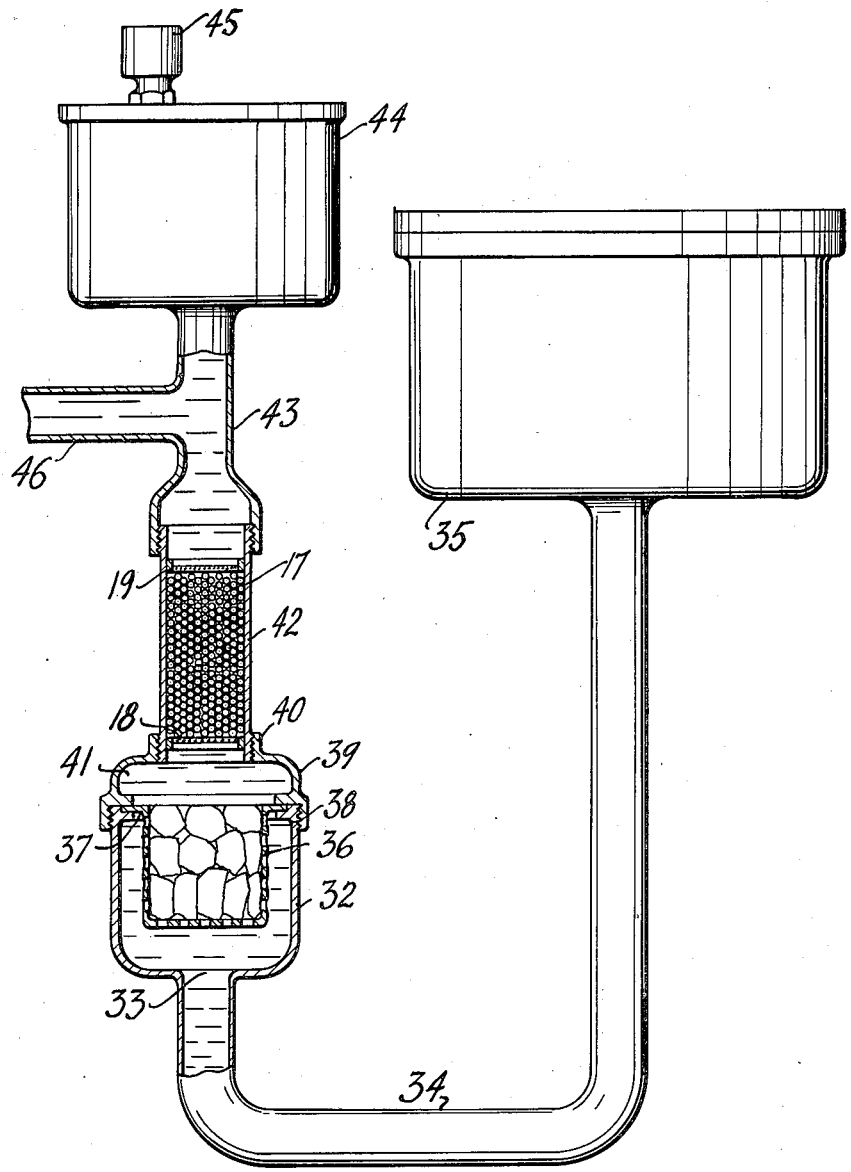
Figure 4 is another form of apparatus by means of which the present process may be carried into operation.

Referring more particularly to the drawings and in the form of the invention shown in Figures 1 and 2, the numeral 10 designates generally a container or receptacle of suitable size and constructed of any suitable material which is sufficient to withstand the necessary pressure.

In the form of the invention shown, the container 10 is preferably provided with a reduced or neck portion 11 forming the entrance thereto, and 12 designates a suitable closure held in position in any suitable manner such as by means of fastening clamps 13.

The numeral 14 designates a chamber of any desired size and configuration having an outlet opening 15 of a diameter preferably considerably less than the internal diameter of the chamber. Connected with the chamber and having communication with the outlet 15 is a tubular extension 16 of substantial length, and arranged within the extension 16 are a multiplicity of elements 17 constructed of any suitable material, preferably glass, and of any desired size and configuration, and are preferably closely arranged, the elements being held in position preferably between spaced screens 18—19 formed of any suitable reticulated material. The elements 17 serve the purpose of presenting maximum surfaces of the liquid and gas as they flow through the extension, in a manner to be set forth and the elements also form tortuous passages for the liquid and gas.

The bottom of the chamber 14 is preferably open and is closed by means of a suitable closure 20, the latter being removably secured in position preferably by means of spring portions 21 which engage over a bead or edge 22 encompassing the open side of the chamber.

Supported by the closure 20 is a receptacle 23 of any desired size but is preferably of an external diameter considerably less than the internal diameter of the chamber 14. The portion of the closure 20 forming the bottom of the receptacle 23 is provided with openings 24 while the wall of the receptacle is provided with openings 25. The closure 20 is also provided with openings 26 outside of the receptacle 23 and these openings permit liquid to flow into the chamber 14 as well as into the receptacle 23.

Within the receptacle 23 is arranged compressed carbon dioxide ($CO_2$) snow preferably in the form of crystals, cubes, blocks, or the like, of substantial size.

A suitable bail or handle 28 is provided on the end of the extension 16 and by means of which bail or handle the chamber 14 with the extension 16 are adapted to be suspended within the container 10 so that the chamber and the carbon dioxide snow will be immersed in the liquid in the container. The suspending flexible element 29 is preferably secured to the closure 12 through the medium of a suitable fastening or anchoring device 30.

It will thus be manifest that when this structure is supported within the container 10 the liquid will contact with the gas generating elements and the generating of the gas will first serve to reduce the temperature of the liquid and create the necessary pressure. At the same time, the gas being generated will, as it is emanated from the generating elements, cause a circulation of the liquid within the container 10 and the circulation of the liquid will cause the liquid together with the gas to flow into and through the extension 16 and out of the top thereof so as to contact with the elements 17. The elements presenting the maximum surface of liquid to the gas will facilitate and insure a thorough impregnation of the liquid with the gas.

Excess gas will accumulate in the neck or throat 11 of the container 10 and a relief valve 31 is provided in the closure 12.

With this structure it will be manifest that when the closure 12 is removed the holder for the gas generating elements may be removed from the receptacle and after the closure 12 is removed another closure may be provided for shipment purposes.

In the form of the invention shown in Figure 4, the container 32 has an inlet opening 33 in the bottom thereof to which a pipe 34 is connected, and this pipe 34 leads from a reservoir or supply tank 35 which contains the liquid to be carbonated, and which liquid is under the necessary pressure. The receptacle 36 in this form of the invention, is supported in the container 32 preferably by means of a flange 37 which rests upon a flange 38 supported by the wall of the container. A cap or closure 39 is removably secured to the container 32 preferably by being threaded thereupon and the closure is provided with an outlet opening 40 and is preferably shaped to form a chamber 41 therein above the receptacle 36. A tubular member 42 is threaded into the opening 40 and is of any desired diameter and of a substantial length, corresponding to the extension 16 of the form of the invention shown in Figures 1 and 2.

Connected to the upper end of the tubular member 42 preferably by being threaded thereto is a coupling 43 which is also connected to and has communication with a receptacle 44, and which receptacle is provided for the purpose of catching and holding excess gas generated by the apparatus. A pressure relief valve 45 is provided for the receptacle 44. Leading from the coupling 43 is a branch 46 through which the carbonated liquid flows to the point of use and this form of the invention is well adapted for dispensing the carbonated liquid for bottling purposes.

Within the tubular member 42 is arranged the separate elements 17 and the elements are held in position by means of the screens or reticulated members 18 and 19, which latter, in this form of the invention as well as in the form of the invention shown in Figures 1 and 2 may be held in position in any suitable manner, such as by friction, or otherwise.

While the preferred forms of apparatus have been herein shown and described and while the preferred method of carrying this invention into operation has also been described, it is to be understood that various changes may be made in the details of construction and in the combination and arrangement of the parts of the apparatus, and various changes may be made in the steps of the process, within the scope of the claims, without departing from the spirit of this invention.

What is claimed as new is:—

1. An apparatus for the purpose of carbonating liquids with compressed carbon dioxide snow which consists of a container for the liquid, a receptacle immersed in the container and in which receptacle the carbon dioxide snow is disposed, and means forming tortuous passages through which the gas and liquid flow, the said means presenting maximum surfaces of liquid to the gas.

2. An apparatus for the purpose of carbonating liquids from compressed carbon dioxide snow, embodying a chamber, a tubular extension of substantial length leading from said chamber, a plurality of separate elements arranged within and substantially filling said extension, and a receptacle within said chamber and in which receptacle the compressed carbon dioxide snow is disposed, said receptacle having apertures in its walls, whereby the liquid will flow through said receptacle into contact with the contents thereof and the gas and liquid will flow through said extension.

3. An apparatus for the purpose of carbonating liquids from compressed carbon dioxide snow, embodying a chamber, a tubular extension of substantial length leading from said chamber, a plurality of separate elements arranged within and substantially filling said extension, a receptacle within said chamber and in which receptacle the compressed carbon dioxide snow is disposed, said receptacle having apertures in its walls, whereby the liquid will flow through said receptacle into contact with the contents thereof and the gas and liquid will flow through said extension, and means for suspending said chamber within liquid under pressure in a container.

4. An apparatus for the purpose of carbonating liquids from compressed carbon dioxide snow, embodying a chamber, a tubular extension of substantial length leading from said chamber, a plurality of separate elements arranged within and substantially filling said extension, a receptacle within said chamber and in which receptacle the compressed carbon dioxide snow is disposed, said receptacle having apertures in its walls, whereby the liquid will flow through said receptacle into contact with the contents thereof and the gas and liquid will flow through said extension, means for suspending said chamber within liquid under pressure in a container, and a relief valve for said container.

5. An apparatus for carbonating liquids with compressed carbon dioxide snow comprising a container for the liquid, a receptacle within the container and of an external diameter considerably less than the internal diameter of the container and in which receptacle the carbon dioxide elements are arranged, means forming a closure for the receptacle and through the medium of which means access may be had to the interior of the container and to the said receptacle, a passageway leading from the said receptacle through which the liquid and gas flow, and a multiplicity of separate elements within said passageway to be contacted by the liquid and gas whereby a maximum surface of liquid will be presented to the gas.

6. A process for carbonating liquid which consists in suspending in a quantity of liquid within a closed receptacle, compressed carbon dioxide snow elements, said elements operating to induce a circulation of the liquid within the receptacle, and then subjecting the circulating liquid and the gases to the action of barriers to insure a thorough commingling of the liquid and gases.

In testimony whereof, I have signed my name to this specification on this 2nd day of June, 1931.

EMERY H. FAHRNEY.